United States Patent [19]

Bareis

[11] Patent Number: 5,706,399
[45] Date of Patent: Jan. 6, 1998

[54] SPEECH CONTROLLED VEHICLE ALARM SYSTEM

[75] Inventor: Bernard F. Bareis, Dallas, Tex.

[73] Assignee: Voice Control Systems, Inc., Dallas, Tex.

[21] Appl. No.: 660,652

[22] Filed: Jun. 3, 1996

Related U.S. Application Data

[63] Continuation of Ser. No. 210,552, Mar. 18, 1994.

[51] Int. Cl.$^6$ ............................................. G10L 3/00
[52] U.S. Cl. ..................... 395/2.83; 395/2.4; 395/2.79
[58] Field of Search ........................... 381/41–43, 86, 381/110; 80/289; 340/825.31, 384.5, 825.32; 367/158; 364/434, 424.04; 395/2, 2.1, 2.79, 2.84, 2.4

[56] References Cited

U.S. PATENT DOCUMENTS

| | | | |
|---|---|---|---|
| 4,637,045 | 1/1987 | Noso et al. | 395/2.84 |
| 4,725,956 | 2/1988 | Jenkins | 364/434 |
| 4,856,072 | 8/1989 | Schneider et al. | 381/86 |
| 5,012,221 | 4/1991 | Neuhaus et al. | 340/384.5 |
| 5,054,082 | 10/1991 | Smith et al. | 381/42 |
| 5,125,022 | 6/1992 | Hunt et al. | 379/88 |
| 5,127,043 | 6/1992 | Hunt et al. | 379/88 |
| 5,193,141 | 3/1993 | Zwern | 395/2 |
| 5,245,694 | 9/1993 | Zwern | 395/2 |
| 5,255,326 | 10/1993 | Stevenson | 381/110 |
| 5,278,547 | 1/1994 | Suman et al. | 340/825.32 |
| 5,297,183 | 3/1994 | Bareis et al. | 379/59 |
| 5,297,194 | 3/1994 | Hunt et al. | 379/88 |
| 5,303,299 | 4/1994 | Hunt et al. | 379/88 |
| 5,315,649 | 5/1994 | Foster et al. | 379/355 |
| 5,365,574 | 11/1994 | Hunt et al. | 379/88 |
| 5,442,553 | 8/1995 | Parrillo | 364/424.04 |

OTHER PUBLICATIONS

Riess, "Cryptographic security for the new trans-european trunked radio (tetra) standard"; IEE Colloquium on 'Security and Crptography Applications to Radio Systems'. p. 3/1–5, 3 Jun. 1994.

Hassan et al, "Voice recognition digital cipher lock for smart vehicles"; proceedings of the 36th Midwest Symposium on Circuits and Systems, p. 352–5 vol. 1, 16–18 Aug. 1993.

*Primary Examiner*—Tariq R. Hafiz
*Attorney, Agent, or Firm*—David H. Judson

[57] ABSTRACT

An advanced electronic vehicle alarm system allows control of alarm functions to be accomplished using specific spoken commands. A microphone converts speech into time-variant voltage levels which are amplified and sent to a analog-to-digital converter and digitized. The digitized data is then processed by a speech recognition subsystem. The speech recognition subsystem separates extraneous speech from words and provides corresponding output signals when control words are recognized. The output signals are preferably employed by the alarm system to operate door locking and unlocking controls, to operate a loud audible siren and/or horn, to operate vehicle light controls, to provide engine cut-off control, to provide engine starting control or to operate a response indicator incorporated in the main alarm processing unit. The response indicator provides verbal responses to confirm spoken commands. A speaker verification capability is also included in the speech recognition subsystem to allow for secured operation of the vehicle alarm system.

17 Claims, 5 Drawing Sheets

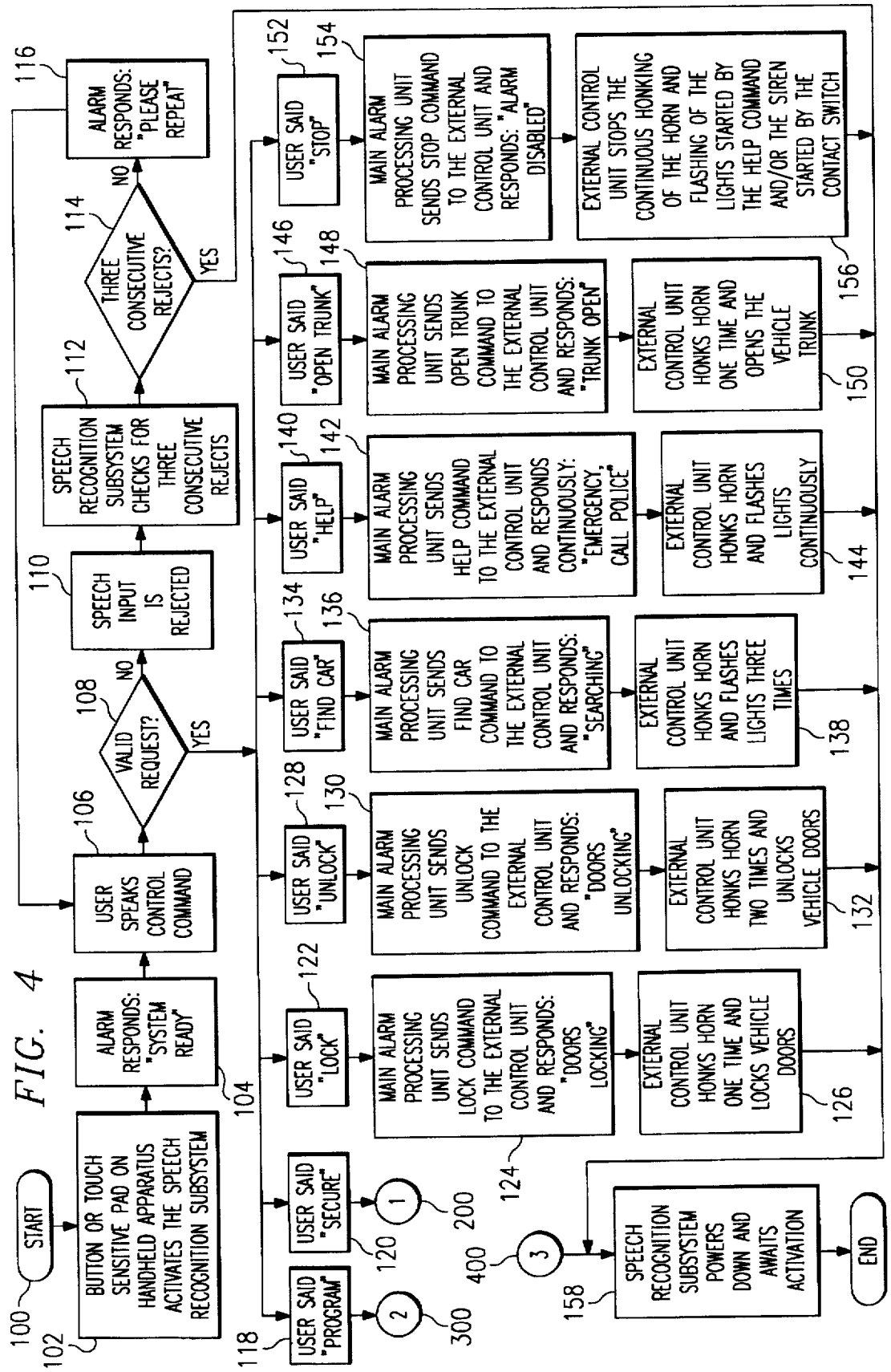

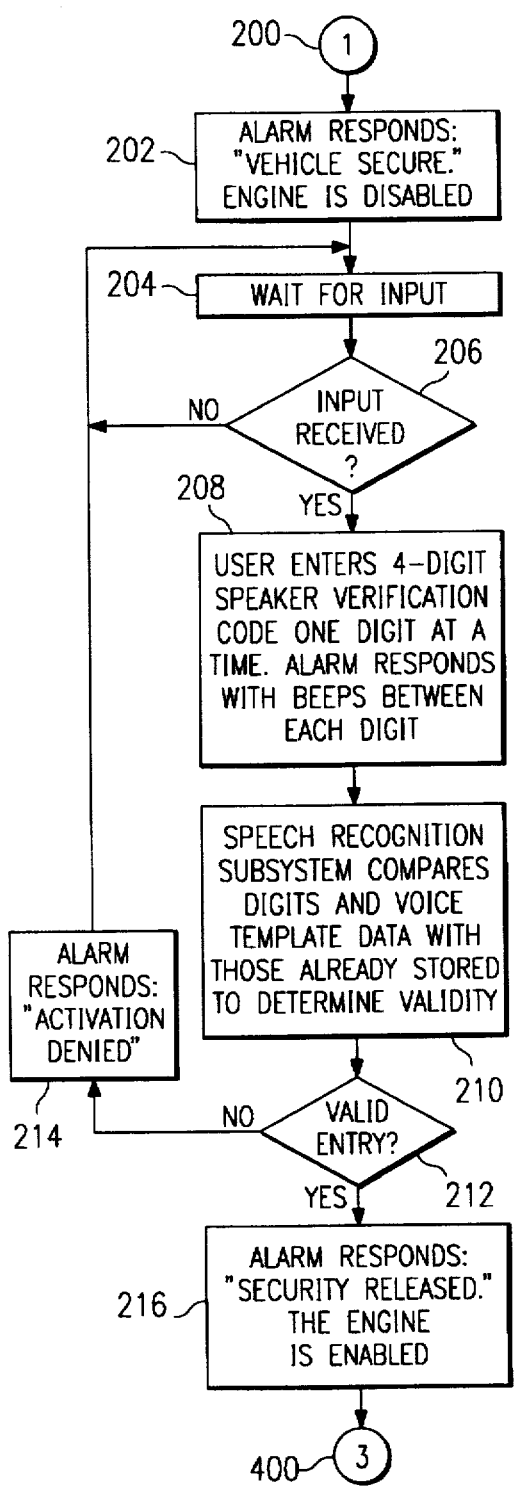
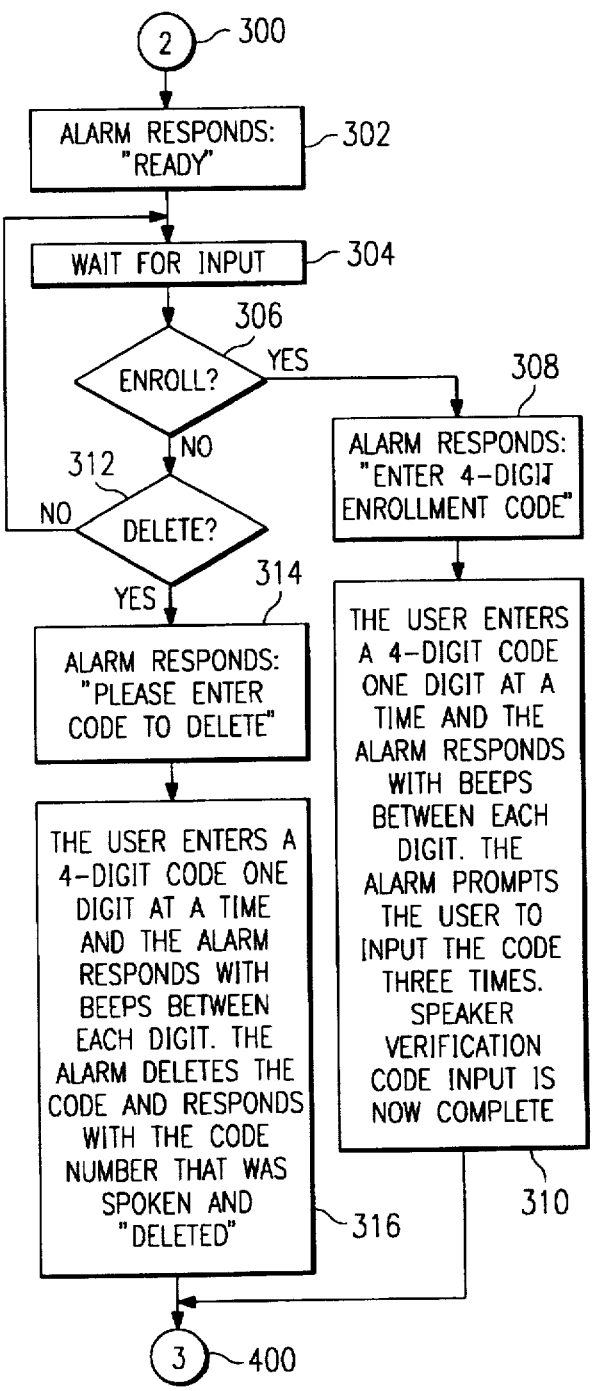
FIG. 5
FIG. 6

SPEECH CONTROLLED VEHICLE ALARM SYSTEM

This is a continuation of co-pending application Ser. No. 08/210,552 filed on Mar. 18, 1994.

TECHNICAL FIELD

The present invention relates generally to vehicle alarm systems and, more particularly, to a system which responds to spoken commands to perform control functions.

BACKGROUND OF THE INVENTION

All present day versions of vehicle alarms require the use of push buttons to perform control functions. Push buttons are mechanical and are subject to failure from metal fatigue, corrosion of electrical contacts, and dirt buildup. Push buttons on control apparatus are also difficult to readily distinguish from one another in poorly lighted areas or at night. Present day versions of vehicle alarms may require pushing more than one button at a time to accomplish operations when not enough buttons are available to compliment the functionality of the alarm. Limiting the number of buttons also serves to reduce button failures; however, such systems require the user to remember cumbersome combinations of buttons to operate the alarm. Additionally, present day vehicle alarms have no method for user-specific activation through the accompanying handheld apparatus and are subject to security problems for this reason, especially if the handheld apparatus is lost or stolen. Thus, existing control systems for vehicle alarms utilize inefficient user interfaces that provide less than satisfactory security.

BRIEF SUMMARY OF THE INVENTION

The present invention overcomes the disadvantages, inefficiencies and security problems associated with existing vehicle alarm systems and provides a more efficient user interface for alarm system control. The preferred user interface is a voice recognition system that implements known speaker-independent discrete, connected or continuous recognition strategies. By using spoken words to control the alarm, the interface to the alarm system is made much easier to operate. Optionally, the operation of the alarm is further secured by using speaker verification technology to make the alarm system more impervious to false usage.

In accordance with one embodiment of the present invention, the Speech Controlled Vehicle Alarm System has a variety of functions that can be activated by the user speaking into the handheld control apparatus or by speaking to a microphone located inside or on the vehicle. For example, to unlock the door of a vehicle, the user speaks the word "unlock" and to lock the vehicle the user speaks the word "lock." Other functions are also controlled by the apparatus. For example, these functions include opening a trunk latch by saying "open trunk," operating the horn and lights for a short duration by saying "find car," and operating a siren or the horn and lights of the automobile for a long duration by saying "help."

The alarm system enables the user to secure the operation of the control functions through the use of speaker verification technology incorporated in the speech recognition subsystem. Prior to operation, in this mode the alarm system requires the user to enroll his or her voice pattern, for example, by saying a four digit number a total of three times one digit at a time. During an exemplary operation, after the user says the word "secure," the alarm will not perform any functions until the same three digit combination is spoken by a person who has performed security code enrollment. The alarm may be configured to enroll more than one user for secure operation. The speech recognition subsystem preferably implements speaker-independent technology for the control functions so that valet drivers or other persons may use the vehicle while access to the alarm is placed in a nonsecure state.

The user is informed as to the status of the operation of the alarm through the use of prerecorded messages. When the user speaks the appropriate security code, the alarm system plays the message "system ready." When the user says the word "lock," the alarm system responds "doors locking" and when the user says "unlock" the alarm system responds "doors unlocking." Other alarm system responses include "emergency, call police," "trunk open," "alarm disabled," and "searching."

For a more complete understanding of the present invention and the advantages thereof, reference should be made to the following Detailed Description taken in connection with the accompanying drawings in which:

BRIEF DESCRIPTION OF THE DRAWINGS

Other objects and advantages of the present invention will be apparent from the following Detailed Description of the preferred embodiments thereof and from the attached Drawings of which:

FIG. 2 illustrates an alternate embodiment of the Speech Controlled Vehicle Alarm System with the speech recognition subsystem located in the handheld apparatus that is typically attached to a keychain or the like;

FIG. 4 is a flowchart of the speaker-independent control word functions showing the operation of the alarm;

FIG. 5 is a flowchart of the security feature using speaker verification operations of the speech recognition subsystem;

FIG. 6 is a flowchart showing how digit codes for the security feature are added or deleted.

DETAILED DESCRIPTION

Figure 1:
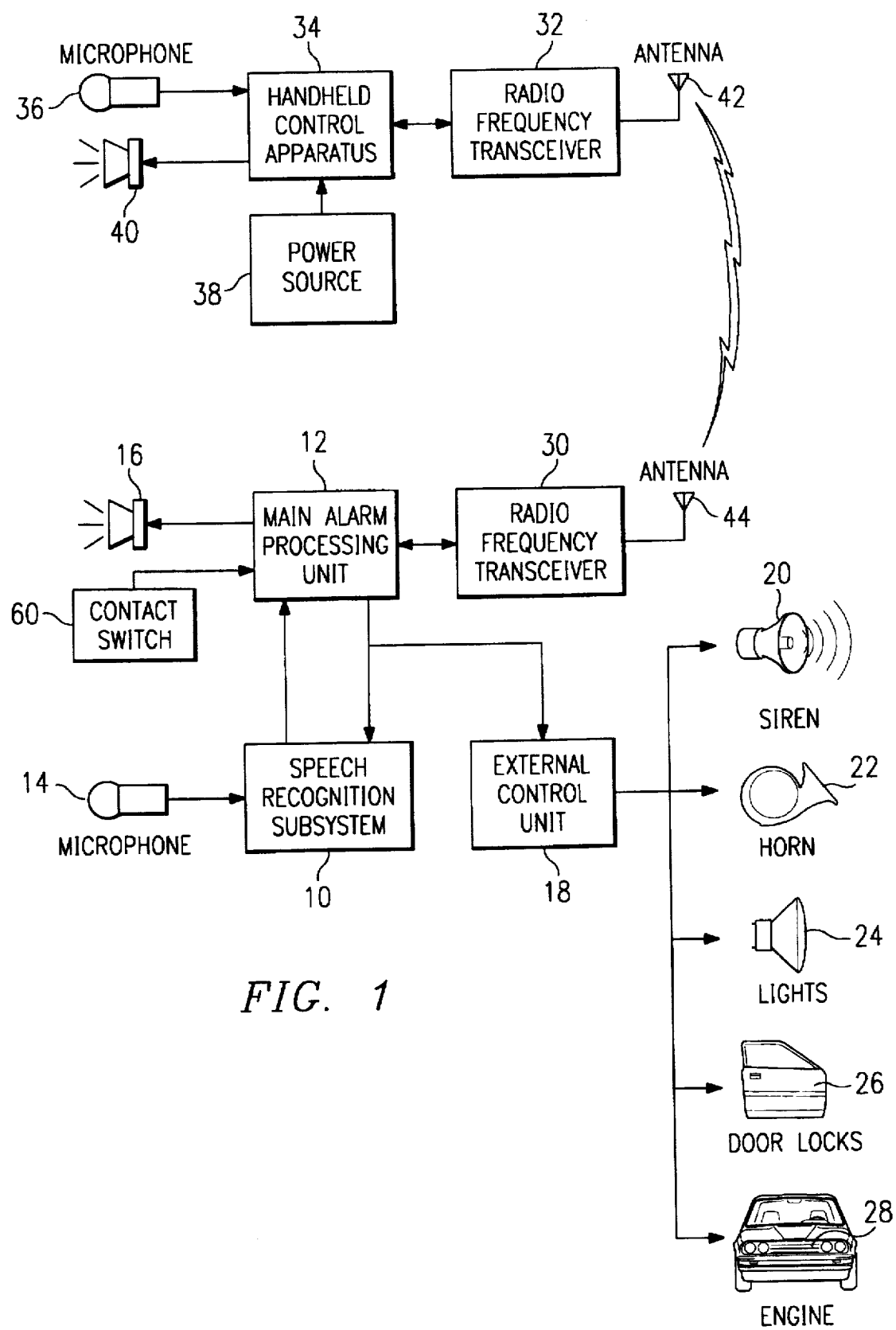
FIG. 1 illustrates a Speech Controlled Vehicle Alarm System with the speech recognition subsystem located in the primary housing of the alarm system which is inside of the vehicle.

The Speech Controlled Vehicle Alarm System (hereinafter "SCVAS") of the present invention is shown in FIG. 1 and includes a speech recognition subsystem 10 located in the primary housing of the main alarm processing unit 12, which includes a processor, associated memory and control programs. In this embodiment, the microphone 14 attached to the speech recognition subsystem 10 is located inside the vehicle near the driver or operator. Spoken commands are received by the microphone 14 as analog sound pressure level signals and are converted to corresponding analog electrical voltage representations. From the microphone 14, the analog electrical voltage signals are sent to the speech recognition subsystem 10 for amplification, digitization, and interpretation. When valid commands are received, as determined by the speech recognition subsystem 10, the speech recognition subsystem 10 will send digital control signals to the external control unit 18 to correspondingly provide for locking and unlocking the doors 26, to operate emergency siren 20, horn 22 or light 24, and for disabling and enabling the engine 28. Unit 18 includes conventional electromechanical or electrical devices such as relays or switches. The speaker 16 is used to play pre-recorded messages to the user, the pre-recorded messages are to instruct the user on his or her progress in using the system. The contact switch 60 is used by the main alarm processing unit 12 to determine when unauthorized entry into the vehicle has occurred.

Referring to FIG. 1, the handheld section of the SCVAS includes a microphone 36, a handheld control apparatus 34, a power source 38, a speaker 40, a radio frequency transceiver 32, and an antenna 42. The microphone 36 receives spoken commands as analog sound pressure level signals converting them to corresponding analog electrical voltage representations which are then sent to the radio frequency transceiver 32 and transmitted from antenna 42. The speech signals are received at antenna 44 and radio frequency transceiver 30. The speech signals are then sent to the main alarm processing unit 12 and transferred to the speech recognition subsystem 10 where they are digitized and interpreted. When valid commands are received, as determined by the speech recognition subsystem 10, the speech recognition subsystem 10 will send digital control signals to the external control unit 18 to correspondingly provide for locking and unlocking the doors 26, for emergency siren 20, horn 22, and light 24 operation, and for disabling and enabling the engine 28. The speaker 40 is likewise used to play pre-recorded messages to the user.

Pre-recorded messages originate from the main alarm processing unit 12 in response to corresponding digital signals from the speech recognition subsystem 10. The pre-recorded messages are sent from the main alarm processing unit 10 through the radio frequency transceiver 30 and are transmitted from antenna 44. The transmitted messages are received by antenna 42 and radio frequency transceiver 32 and are sent to the handheld control apparatus where they are amplified and played through the speaker 40. In the described embodiment of the present invention, the speech and pre-recorded messages are sent between the handheld unit and the in-vehicle alarm unit in an analog format. The format for transmitting and receiving speech and pre-recorded messages could also be implemented as a digital format.

Figure 2:
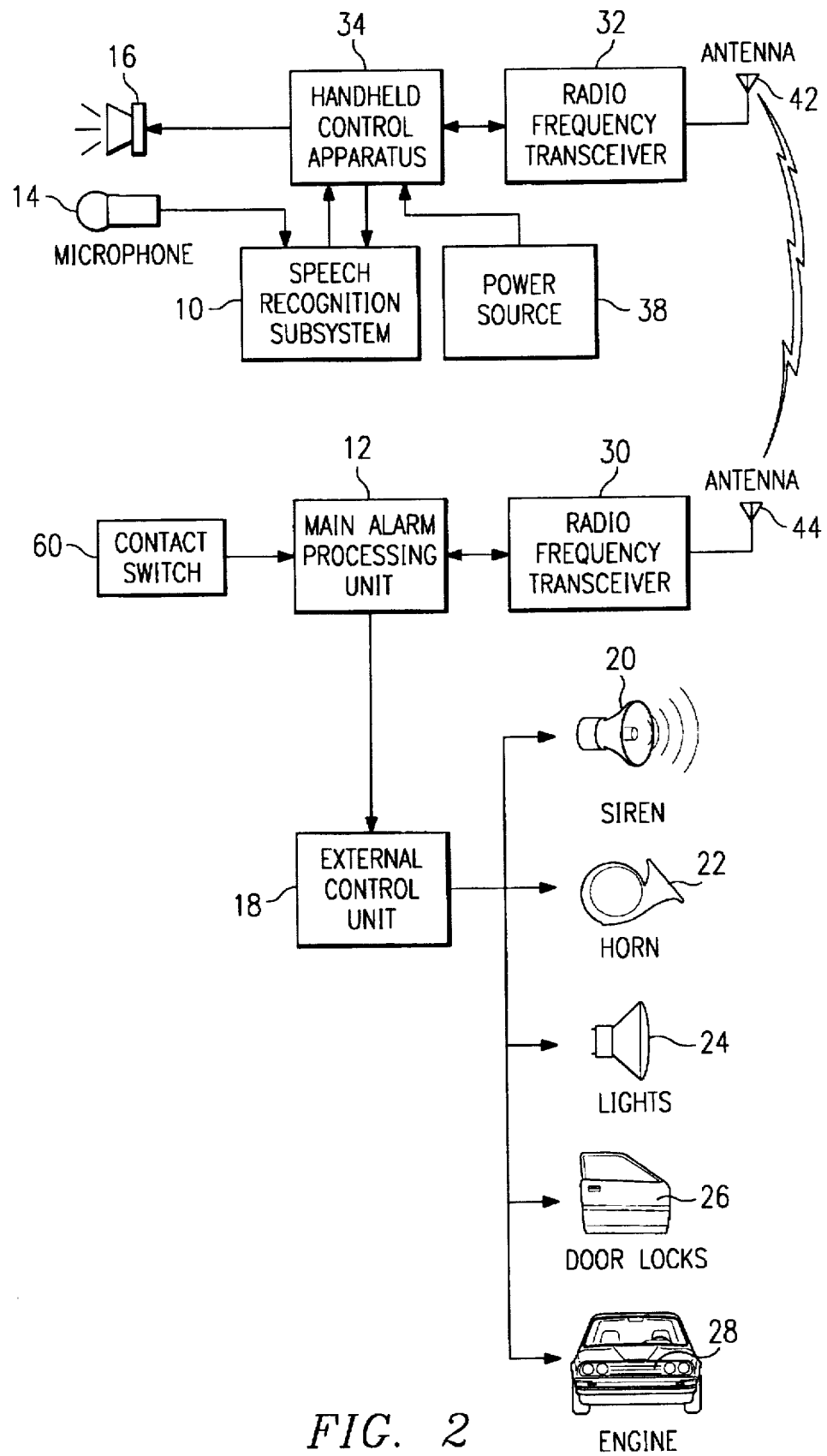

Referring to the alternate embodiment of FIG. 2, microphone 14 is connected to the speech recognition subsystem 10 as illustrated in FIG. 1 and described with respect to spoken command input above with the exception that the speech recognition subsystem 10 is located in the handheld unit and commands between the speech recognition subsystem 10 and the main alarm processing unit 12 traverse from the speech recognition subsystem 10 through the handheld control apparatus 34 and are transmitted through the radio frequency transceiver 32 and antenna 42. The digital commands are then received through antenna 44 and radio frequency transceiver 30 and sent to the main alarm processing unit 22.

In the reverse direction, commands sent from the main alarm processing unit 12 to the speech recognition subsystem 10 travel from the main alarm processing unit 12 and are transmitted through radio frequency transceiver 30 and antenna 44. The commands are received through antenna 42 and radio frequency transceiver 32 and are then transferred through the handheld control apparatus 34 to the speech recognition subsystem 10.

Because the speech recognition subsystem 10 uses large amounts of power from the power source 38, typically a lithium battery, a single button or touch sensitive switch which is part of the handheld control apparatus 34 is preferably used to apply power to the speech recognition subsystem 10 while the user is grasping the handheld unit; this is done in order to conserve power and to extend the life of the battery.

Figure 3:
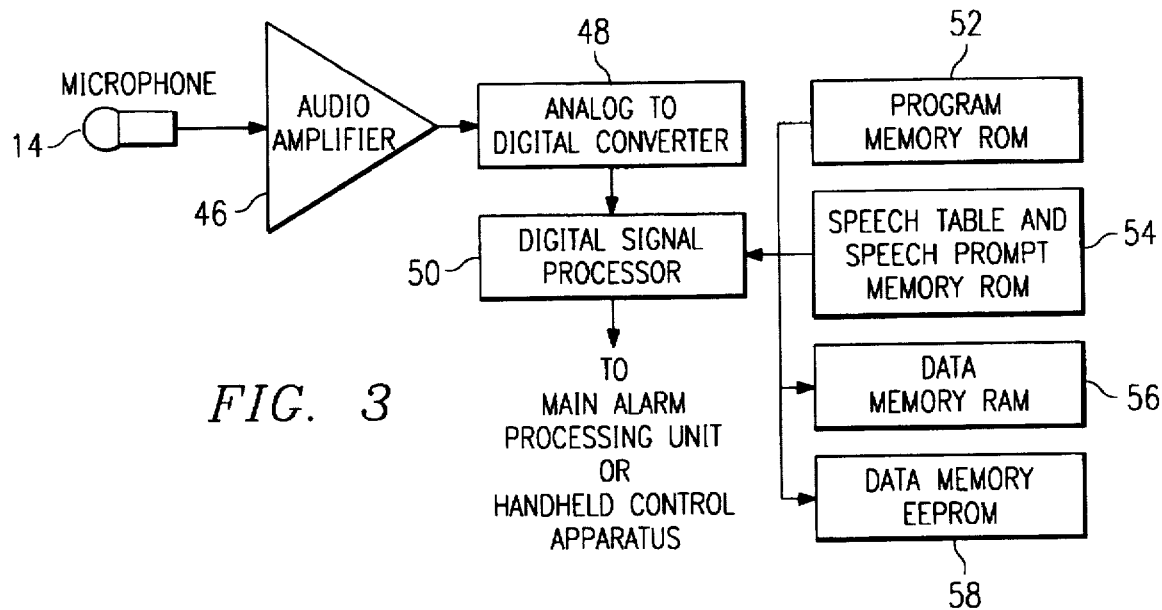
FIG. 3 is a block diagram of the speech recognition subsystem.

Referring to FIG. 3, the speech recognition subsystem 10 of FIG. 1 and FIG. 2 includes an audio amplifier 46, a analog-to-digital converter 48, a digital signal processor (hereinafter "DSP") 50, a program memory read-only-memory device (hereinafter "ROM") 52, a speech table and speech prompt memory ROM 54, a data memory random-access-memory device (hereinafter "RAM") 56, and a non-volatile data memory electrically-erasable-programmable-read-only-memory device, (hereinafter "EEPROM") 58. The DSP 50 processes algorithm code stored in the program memory ROM 52. The algorithm code allows the DSP 50 to analyze incoming speech data and to determine the appropriate response corresponding to the given speech command. Speech recognition may be discrete, connected or continuous.

When speech recognition or speaker verification functions are occurring, speech is received by the microphone 14 and converted into time-variant voltage levels which are amplified by the audio amplifier 46, sent to a analog-to-digital converter 48 and digitized, and temporarily stored in a buffer area located in data memory RAM 56. The speech data in data memory RAM 56 is acted upon by the DSP 50 according to speech recognition and/or speaker verification algorithms stored in program memory ROM 52. When recognizing speaker-independent words, the DSP 50 compares the speech data to templates that are permanently encoded in to speech table and speech prompt memory ROM 54. When recognizing speaker verification codes, the DSP 50 compares the speech data to templates that were previously, stored by the user in data memory EEPROM 58. Once the appropriate output response is determined by the DSP 50, the response will be sent either directly to the main alarm processing unit 12 as in FIG. 2 or to the main alarm processing unit 12 via the handheld control apparatus 34 as in FIG. 1. Upon receiving the command from the DSP 50, the main alarm processing unit 12 will perform the corresponding function for the spoken input.

FIG. 4 is a flowchart of the primary operating routine 100 of the SCVAS. In the first step 102, the user activates the speech recognition subsystem by pressing a single button or by coming in contact with a touch sensitive pad. The main alarm processing unit 12 of the SCVAS responds by playing the pre-stored message "system ready" 104. After the pre-stored message prompt is played, the speech recognition subsystem 10 receives a command from the main alarm processing unit 12 to start analyzing incoming speech data. Once the user speaks a control command 106, the speech recognition subsystem 10 determines whether or not spoken word template statistically matches a template stored in the active vocabulary in the speech table and speech prompt memory ROM 54. The validity of the spoken word is tested in step 108.

If the input was not valid, the program proceeds to step 110 where the speech input is rejected. Step 112 is used to determine whether or not a number of false triggers on random sounds is occurring as would be the case if the unit was inadvertently engaged. If three consecutive rejects have occurred in step 114, the program proceeds to step 158 and causes the speech recognition subsystem 10 to power down. If fewer than three consecutive rejects have occurred at step 114, then the SCVAS responds with the message prompt "please repeat" 116 and the program proceeds to step 106 waiting for the user to speak.

At step 108 if the input was valid, then the program proceeds to the step corresponding to the spoken command. If the user said the command "program" 118, then the program proceeds to the speaker verification code update subroutine 300 of FIG. 6. If the command "secure" 120 was spoken, then the program proceeds to the secure mode subroutine 200 of FIG. 5.

If the command "lock" 122 was spoken, the program proceeds to step 124 where the main alarm processing unit 12 sends the lock command to the external control unit 18. The SCVAS responds with the message "doors locking." After receiving the lock command, the external control unit honks the horn 22 one time and locks the vehicle doors 26 in step 126. Next, the program proceeds to step 158 where the speech recognition subsystem 10 powers down and awaits activation.

If the user spoke the command "unlock" 128, the program proceeds to step 130 where the main alarm processing unit 12 sends the unlock command to the external control unit 18. The SCVAS responds with the message "doors unlocking." After receiving the unlock command, the external control unit 18 preferably honks the horn 22 two times and unlocks the vehicle doors 26 in step 132. Next, the program proceeds to step 158 where the speech recognition subsystem 10 powers down and awaits activation.

If the command "find car" 134 was spoken, the program proceeds to step 136 where the main alarm processing unit 12 sends the find car command to the external control unit 18. The SCVAS responds with the message "searching." After receiving the find car command, the external control unit 18 preferably honks the horn 22 and flashes the lights 24 three times 138. Next, the program proceeds to step 158 where the speech recognition subsystem 10 powers down and awaits activation.

If the user spoke the command "help" 140, the program proceeds to step 142 where the main alarm processing unit 12 sends the help command to the external control unit 18. The SCVAS responds with the repeating message "emergency, call police." After receiving the help command, the external control unit 18 preferably honks the horn 22 and flashes the lights 24 continuously 144; the repeating message, honking horn 22 and flashing lights 24 can only be stopped when the user speaks the stop command 152 after reactivating the SCVAS. Next, the program proceeds to step 158 where the speech recognition subsystem 10 powers down and awaits activation.

If the command "open trunk" 146 was spoken, the program proceeds to step 148 where the main alarm processing unit 12 sends the open trunk command to the external control unit 18. The SCVAS responds with the message "trunk open." After receiving the open trunk command, the external control unit 18 honks the horn 22 one time and opens the vehicle trunk 150. Next, the program proceeds to step 158 where the speech recognition subsystem 10 powers down and awaits activation.

If the user spoke the command "stop" 152, the program proceeds to step 154 where the main alarm processing unit 12 sends the stop command to the external control unit 18. The SCVAS responds with the message "alarm disabled." After receiving the stop command, the external control unit 18 stops the continuous honking of the horn 22 and flashing of the lights 24 started by the "help" 140 command being spoken and/or stops the siren 20 engaged after a vehicle break-in has been confirmed by the unauthorized entry detection subroutine 500 of FIG. 7. Next, the program proceeds to step 158 where the speech recognition subsystem 10 powers down and awaits activation.

Of course, the operations described in steps 118, 120, 122, 128, 134, 140, 146 and 152 are merely exemplary, as other control functions may be implemented in a like manner. As just one example, the subsystem 10 may be used to control access to a car phone, a glove compartment, a CD player, a childproof door lock or any other access-controlled function.

Referring to FIG. 5, the secure mode subroutine 200 is entered after the user has spoken the command "secure" 120 of FIG. 4. The SCVAS responds with the message "vehicle secure" and the main alarm processing unit 12 sends a command to the external control unit 18 to disable the engine 28 in step 202. At step 204, the speech recognition subsystem 10 waits for a spoken input. If no input was received in step 206, then the program proceeds back to step 204. If an input was received in step 206, then the speech recognition subsystem 10 begins collecting the spoken security code digit sequence and begins storing user specific voice template data in data memory RAM 56; the SCVAS responds with a beep between each spoken digit in step 208. Next, the speech recognition subsystem 10 compares the digits received for a valid combination and compares the user specific template data with voice template data already stored in nonvolatile data memory EEPROM 58 to determine its validity in step 210. At step 212, a test is performed and if the entry is not valid, then the SCVAS responds "activation denied" 214 and the program proceeds back to step 204 and waits for a valid input. If the input at step 212 is valid, then the SCVAS responds "security released" and the vehicle engine 28 is enabled in step 216. Next, the program returns 400 from the secure mode subroutine 200 to step 158 of FIG. 4 and the speech recognition subsystem 10 powers down and awaits activation.

Referring to FIG. 6, the speaker verification code update subroutine 300 is entered after the user has spoken the command "program" 118 of FIG. 4. The SCVAS responds with the message "ready" and the main alarm processing unit 12 sends a command to the speech recognition subsystem 10 to wait for a spoken input 304. If the "enroll" command was not spoken in step 306 and if the "delete" command was not spoken in step 312, the program proceeds back to step 304 and waits for a spoken input.

If the "enroll" command was spoken, the program will proceed from step 306 to step 308 where the SCVAS responds with the message prompt "enter 4-digit enrollment code." Next, the program proceeds to step 310 where the user enters the 4-digit security code one digit at a time. The SCVAS responds with a beep between each digit that the user speaks. The SCVAS prompts the user to enter the security code a total three times. Once the code has been entered, it is stored along with user specific template data in nonvolatile data memory EEPROM 58 and the program returns 400 from the speaker verification code update subroutine 300 to step 158 of FIGURE 4 where the speech recognition subsystem 10 powers down and awaits activation.

If the "delete" command was spoken, the program will proceed from step 312 to step 314 where the SCVAS responds with the message prompt "please enter code to delete." Next, the program proceeds to step 316 where the user enters a 4-digit code one digit at a time. The SCVAS responds with a beep between each digit that the user speaks. Once the code number has been entered, the code number and the associated user specific template data are erased from the nonvolatile data memory EEPROM 58. The SCVAS responds by repeating the number that was spoken and playing the message "deleted." Next, the program returns 400 from the speaker verification code update subroutine 300 to step 158 of FIG. 4 where the speech recognition subsystem 10 powers down and awaits activation.

Figure 7:
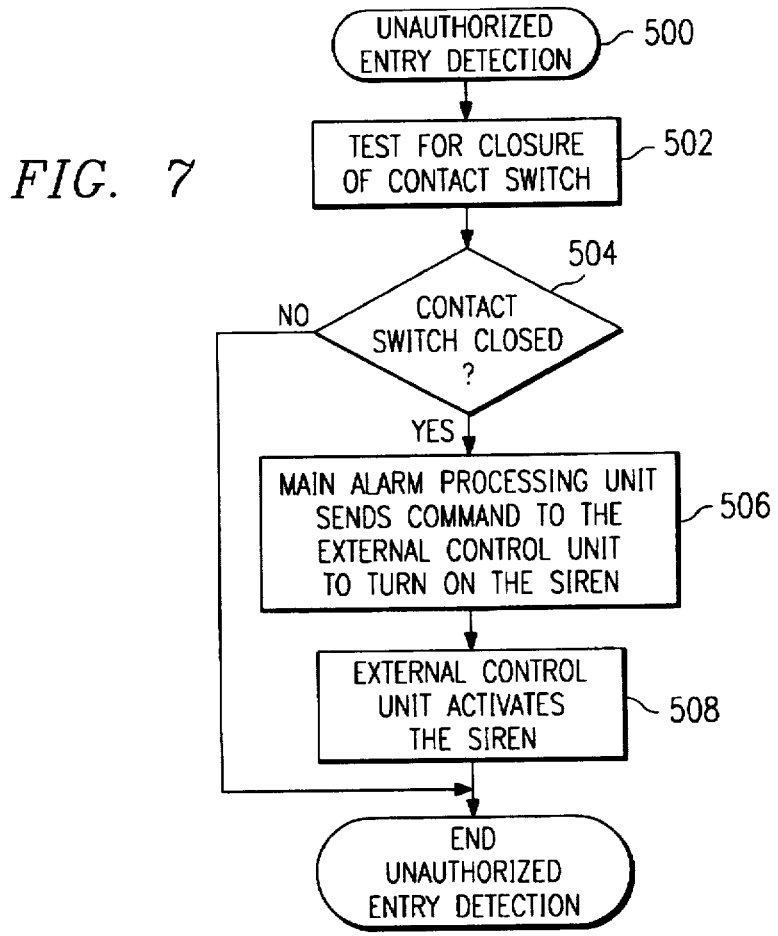
FIG. 7 is a flowchart showing the operation of the subroutine for handling nonauthorized vehicle entry.

Referring to FIG. 7, the unauthorized entry detection subroutine 500 is periodically entered every 10 milliseconds to poll the contact switch 60 in step 502 to confirm whether or not the vehicle has been violated. The resultant of step 502 is tested in step 504. If the contact switch is not closed, then a violation has not occurred and the unauthorized entry detection subroutine 500 ends and the program flow continues. If the contact switch is closed, then a violation has occurred and the main alarm processing unit 12 sends a command to the external control unit 18 to turn on the siren 20 in step 506. Next, the external control unit 18 activates the siren 20 in step 508 and the unauthorized entry detection subroutine 500 ends and the program flow continues.

Of course, variations of the above preferred operation are within the scope of the invention. For example, the "secure" mode subroutine can be used to control access to the vehicle trunk to provide added security to step 146. Also, the reference herein to "vehicle" is to be interpreted broadly to include automobiles, trucks, buses, passenger transports or other conveyances.

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

What is claimed is:

1. A control system for a vehicle, comprising:

a control unit having a power source, input means for receiving operator commands, a transceiver for transmitting operator commands and for receiving messages from the vehicle, and output means for announcing the received messages to a user of the control unit;

a responder unit carried in the vehicle and including a transceiver and means for controlling at least one function associated with the vehicle, the responder unit being actuated by an operator command transmitted from the control unit to enable the user to control the at least one function using spoken commands; and a speech recognition subsystem for identifying a first spoken command and a control function associated with the first spoken command using speaker-independent processing, and responsive to identification of a control function relating to enablement or disablement of control functions, for identifying a second spoken command using speaker-dependent processing to verify the user has authority to enable or disable the control functions.

2. The system as described in claim 1 wherein the speech recognition subsystem is located in the control unit.

3. The system as described in claim 2 wherein the input means of the control unit includes a switch that upon actuation by the user selectively powers the speech recognition subsystem.

4. The system as described in claim 1 wherein the speech recognition subsystem is located in the vehicle.

5. The system as described in claim 1 wherein the input means of the control unit includes a microphone and at least one control button.

6. The system as described in claim 1 wherein the output means is a speaker for providing control or status messages.

7. The system as described in claim 1 wherein the speech recognition subsystem further includes means for verifying the identity of a user before the user is allowed to control a function with spoken commands.

8. The system as described in claim 1 wherein the functions include door locking/unlocking.

9. The system as described in claim 1 wherein the functions include trunk opening.

10. The system as described in claim 1 wherein the functions include actuating a vehicle horn.

11. The system as described in claim 1 wherein the alarm functions include actuating vehicle lights in a predetermined manner.

12. The system as described in claim 1 wherein the alarm functions include controlling the vehicle engine through verifying the identity of a person who desires to operate the vehicle.

13. The control system of claim 1 further including means for monitoring unauthorized entry into the vehicle, wherein the means for monitoring generates an activation signal to an external alarm upon detection of an unauthorized entry.

14. A hand held control unit remotely located from a responder unit carried in a vehicle for controlling one or more vehicle functions associated with the vehicle, the control unit comprising:

a power source;

a microphone for receiving commands spoken by a user;

a transceiver;

a speech recognition subsystem for identifying a first spoken command and a control function associated with the first spoken command using speaker-independent processing, and responsive to identification of a control function relating to enablement or disablement of control functions, for identifying a second spoken command using speaker-dependent processing to verify the user has authority to enable or elisable the control functions;

a switch that upon actuation by the user selectively powers the speech recognition subsystem; and a means for announcing control or status messages to the user.

15. The control unit in claim 14 wherein the means for announcing control or status messages to the user comprises a speaker.

16. A responder unit for use in a control system for a vehicle responsive to a remotely located control unit carried by a user, the responder unit comprising:

a transceiver for receiving signals from and transmitting signals to the remotely located control unit;

means for controlling one or more functions associated within the vehicle, the responder unit being operated by the remotely located control unit upon receipt of a signal to enable the user to control the functions using spoken commands;

a speech recognition subsystem for identifying a first spoken command and a control function associated with the first spoken command using speaker-independent independent processing, and responsive to identification of a control function relating to enablement or disablement of control functions for identifying a second spoken command using speaker-dependent processing to verify the user has authority to enable or disable the control functions;

means for announcing control or status messages to the user through the control unit.

17. The responder unit as described in claim 16 wherein the speech recognition subsystem further includes means for verifying the identity of a user before the user is allowed to control a function with spoken commands.

* * * * *